(12) United States Patent
Kunze

(10) Patent No.: US 10,430,674 B2
(45) Date of Patent: Oct. 1, 2019

(54) VEHICLE VISION SYSTEM USING REFLECTIVE VEHICLE TAGS

(71) Applicant: MAGNA ELECTRONICS INC., Auburn Hills, MI (US)

(72) Inventor: Norbert Kunze, Diez (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 276 days.

(21) Appl. No.: 15/376,818

(22) Filed: Dec. 13, 2016

(65) Prior Publication Data

US 2017/0169301 A1 Jun. 15, 2017

Related U.S. Application Data

(60) Provisional application No. 62/330,559, filed on May 2, 2016, provisional application No. 62/266,734, filed on Dec. 14, 2015.

(51) Int. Cl.
| | | |
|---|---|---|
| *G06K 9/00* | (2006.01) | |
| *G06F 17/30* | (2006.01) | |
| *G06K 7/14* | (2006.01) | |
| *G06K 7/10* | (2006.01) | |
| *B60Q 1/08* | (2006.01) | |
| *H04N 7/18* | (2006.01) | |
| *B60Q 1/14* | (2006.01) | |

(52) U.S. Cl.
CPC ......... *G06K 9/00825* (2013.01); *B60Q 1/143* (2013.01); *G06K 7/10722* (2013.01); *G06K 7/1413* (2013.01); *G06K 7/1417* (2013.01); *G06K 9/00805* (2013.01); *B60Q 2300/42* (2013.01)

(58) Field of Classification Search
CPC ........... G06K 9/00825; G06K 9/00805; G06K 7/1417; G06K 7/10722; G06K 7/1413; B60Q 1/085; H04N 7/183; G06F 17/30247
USPC ......................................................... 348/148
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |

(Continued)

FOREIGN PATENT DOCUMENTS

| | | |
|---|---|---|
| CN | 103150538 A * | 3/2013 |
| DE | 102013200381 | 7/2014 |

(Continued)

*Primary Examiner* — Zaihan Jiang
(74) *Attorney, Agent, or Firm* — Honigman LLP

(57) ABSTRACT

A vision system of a vehicle includes a camera configured to be disposed at a vehicle so as to have a field of view exterior of the vehicle. A tag or retroreflective element is disposed at another vehicle. With the camera disposed at the vehicle and when the tag element is present in the camera's field of view, an image processor is operable to process captured image data to determine a pattern of the tag element present in the field of view of the camera. The image processor compares the determined pattern of the tag element to a database of patterns and classifies the tag element at least in part responsive to determination that the determined pattern of the tag element generally matches a pattern of the database. The pattern of the tag element disposed at the other vehicle includes information pertaining to a type of the other vehicle.

18 Claims, 7 Drawing Sheets

(56) References Cited

U.S. PATENT DOCUMENTS

| | | | |
|---|---|---|---|
| 5,796,094 A | 8/1998 | Schofield et al. | |
| 5,949,331 A | 9/1999 | Schofield et al. | |
| 6,101,428 A * | 8/2000 | Snyder | B60R 25/245 |
| | | | 340/425.5 |
| 6,690,268 B2 | 2/2004 | Schofield et al. | |
| 6,693,517 B2 | 2/2004 | McCarthy et al. | |
| 7,038,577 B2 | 5/2006 | Pawlicki et al. | |
| 7,466,223 B2 * | 12/2008 | Sefton | G08G 1/0175 |
| | | | 340/521 |
| 7,580,795 B2 | 8/2009 | McCarthy et al. | |
| 7,720,580 B2 | 5/2010 | Higgins-Luthman | |
| 7,855,755 B2 | 12/2010 | Weller et al. | |
| 9,146,898 B2 | 9/2015 | Ihlenburg et al. | |
| 9,778,653 B1 * | 10/2017 | McClintock | B60L 11/1827 |
| 2002/0176605 A1 | 11/2002 | Stafsudd et al. | |
| 2003/0162528 A1 * | 8/2003 | Juzswik | G07C 9/00182 |
| | | | 455/411 |
| 2004/0104815 A1 * | 6/2004 | Suyama | B60Q 1/323 |
| | | | 340/426.16 |
| 2005/0055582 A1 * | 3/2005 | Bazakos | G06K 9/00228 |
| | | | 726/19 |
| 2005/0073436 A1 * | 4/2005 | Negreiro | G08G 1/017 |
| | | | 340/937 |
| 2005/0152581 A1 | 7/2005 | Hoki et al. | |
| 2006/0082438 A1 * | 4/2006 | Bazakos | G06K 9/00255 |
| | | | 340/5.82 |
| 2007/0221822 A1 | 9/2007 | Stein et al. | |
| 2007/0253597 A1 | 11/2007 | Utida et al. | |
| 2008/0043099 A1 | 2/2008 | Stein et al. | |
| 2011/0095908 A1 * | 4/2011 | Nadeem | B60H 3/00 |
| | | | 340/905 |
| 2011/0295697 A1 * | 12/2011 | Boston | B60Q 1/503 |
| | | | 705/14.68 |
| 2012/0062743 A1 | 3/2012 | Lynam et al. | |
| 2012/0218412 A1 | 8/2012 | Dellantoni et al. | |
| 2013/0002873 A1 | 1/2013 | Hess | |
| 2013/0222592 A1 | 8/2013 | Gieseke et al. | |
| 2014/0067206 A1 | 3/2014 | Pflug | |
| 2014/0160276 A1 * | 6/2014 | Pliefke | B60R 1/00 |
| | | | 348/118 |
| 2014/0218529 A1 | 8/2014 | Mahmoud et al. | |
| 2014/0375476 A1 | 12/2014 | Johnson et al. | |
| 2015/0124096 A1 | 5/2015 | Koravadi | |
| 2015/0158499 A1 | 6/2015 | Koravadi | |
| 2015/0251599 A1 | 9/2015 | Koravadi | |
| 2015/0344028 A1 | 12/2015 | Gieseke et al. | |
| 2015/0352953 A1 | 12/2015 | Koravadi | |
| 2016/0036917 A1 | 2/2016 | Koravadi et al. | |
| 2016/0075332 A1 | 3/2016 | Edo-Ros | |
| 2016/0147990 A1 * | 5/2016 | Schneider | G06F 21/44 |
| | | | 726/19 |
| 2016/0162747 A1 | 6/2016 | Singh et al. | |
| 2016/0210853 A1 | 7/2016 | Koravadi | |
| 2016/0300119 A1 * | 10/2016 | Silva | G06F 17/30321 |
| 2017/0083774 A1 | 3/2017 | Solar et al. | |

FOREIGN PATENT DOCUMENTS

| | | | |
|---|---|---|---|
| GB | 002440003 A | * | 7/2006 |
| GB | 2440003 A | * | 10/2006 |

* cited by examiner

VEHICLE VISION SYSTEM USING REFLECTIVE VEHICLE TAGS

CROSS REFERENCE TO RELATED APPLICATIONS

The present application claims the filing benefits of U.S. provisional applications, Ser. No. 62/330,559, filed May 2, 2016, and Ser. No. 62/266,734, filed Dec. 14, 2015, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

Early known head light control systems aimed to switch between the conventional high beam and low beam automatically, instead of manually by driver actuation. These early systems typically tried to determine headlights or taillights of vehicles distinct from non-vehicle light sources and reflections captured by a front vehicle camera. Examples of prior systems are described in U.S. Pat. No. 5,796,094 and/or U.S. Publication Nos. US-2007-0253597; US-2005-152581; US-2008-0043099 and/or US-2007-0221822, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and provides and provides identification of passive light sources or retroreflective elements or tags in the field of view of the camera or cameras.

The vision system of the present invention includes a camera disposed at a vehicle and having a field of view exterior of the vehicle and an image processor operable to process image data captured by the camera. The image processor is operable to process captured image data to classify a tag or retroreflective reflector or element present in the field of view of the camera. The image processor compares a determined pattern of the retroreflective element to a database of patterns and identifies the retroreflector element as being on another vehicle, and may determine information about the other vehicle, such as a size or width of the other vehicle or the like.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
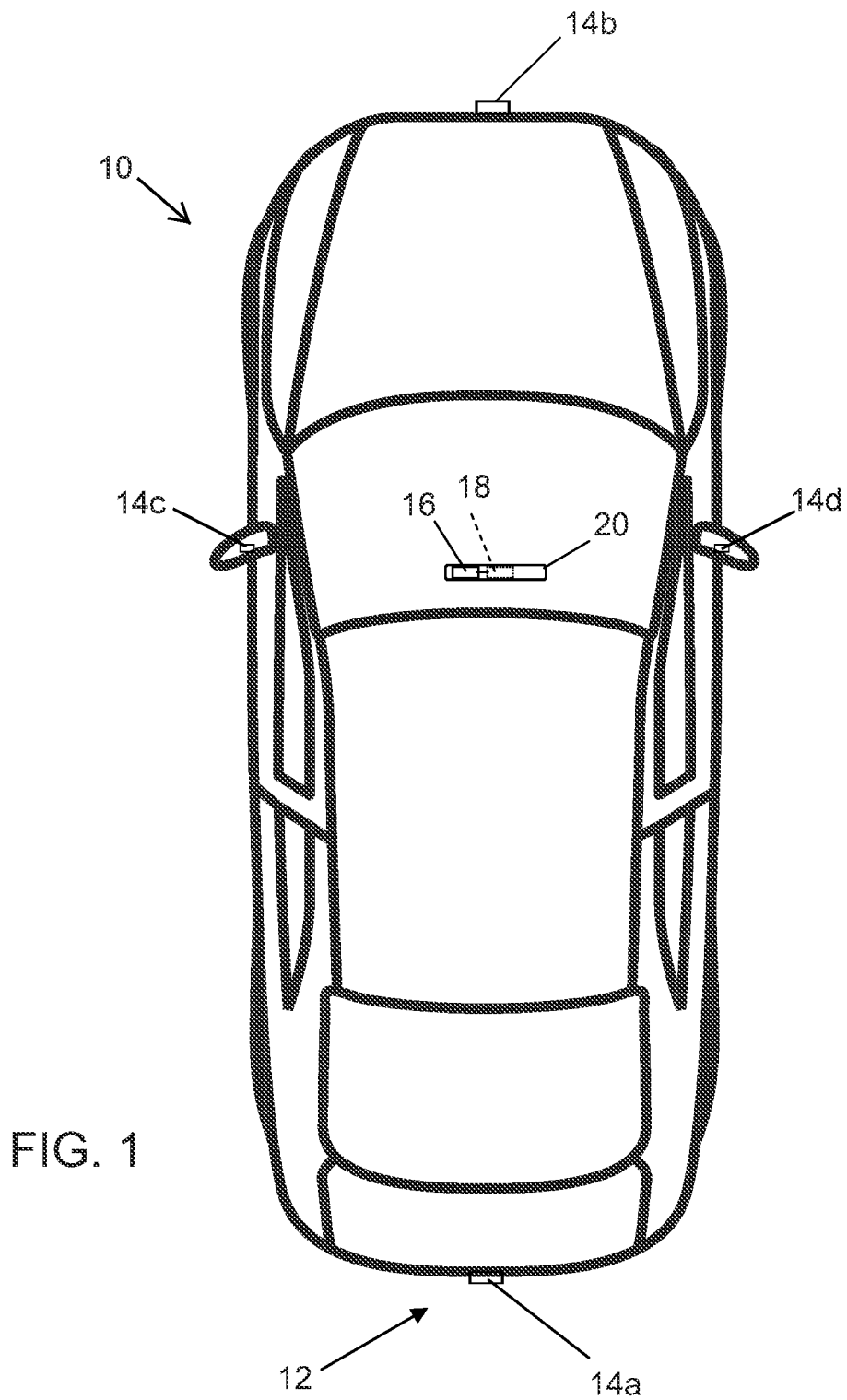
FIG. 1 is a plan view of a vehicle with a vision system that incorporates surround view cameras in accordance with the present invention.
Figure 2:
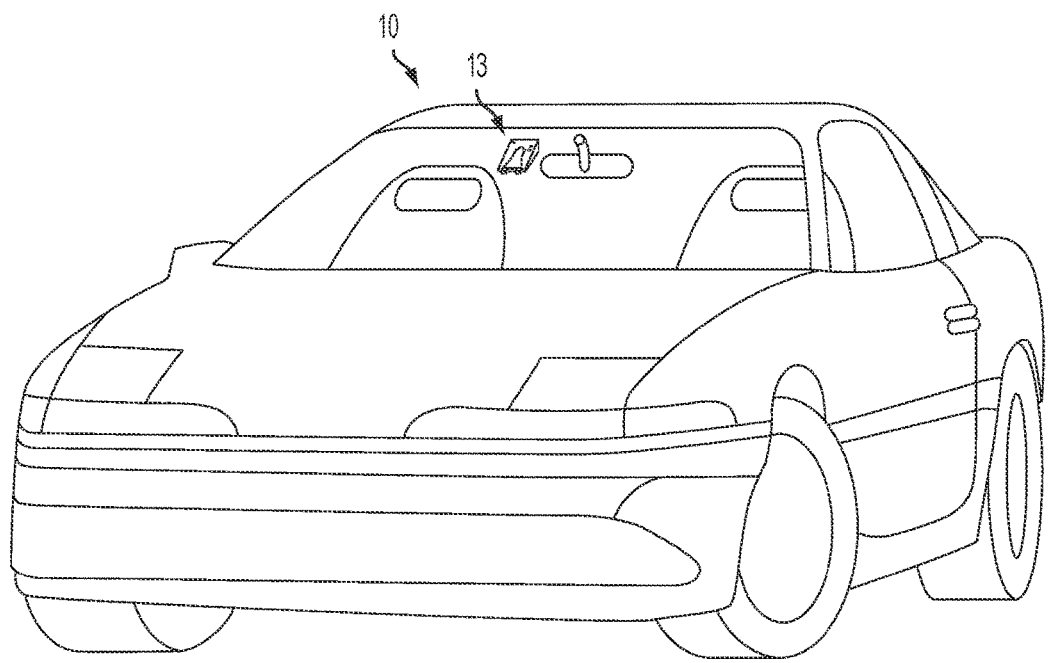
FIG. 2 is a perspective view of a vehicle with a driver assistance system that incorporates a forward viewing camera in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera forward viewing module 13 may be disposed at the windshield of the vehicle and view through the windshield and forward of the vehicle (FIG. 2), such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). Optionally, the ECU may be incorporated in or at a forward viewing module 13. The data transfer or signal communication from the camera to the ECU may comprise any suitable data or communication link, such as a vehicle network bus or the like of the equipped vehicle.

A vehicle vision system with detection enhancement by controlling head lights is described in U.S. patent application Ser. No. 15/273,752, filed Sep. 23, 2016, which is hereby incorporated herein by reference in its entirety. The enhancement is done such that the detection system is capable to predict the further extension of a road marking by currently detected markings in (night) forward view by following the road marking by the controlled light cone, which than enables an even further lane marking detection. By that a positive feedback loop is created.

In U.S. Publication No. US-2016-0162747, which is hereby incorporated herein by reference in its entirety, the detection of a motion pattern of passive (reflected) lights or retroreflectors, such as the motion pattern of a cyclists, especially the motion pattern of its spoke reflectors, is described, along with the detection of dedicated key markers or known visual cues of naturally or artificial present objects or shapes or dedicated pattern or shapes. Especially the detection of visual codes such as bar codes (such as RSS-14, UPC-E, Code ITF 2/5) or two dimensional (2D) codes (such as Aztec, Vericode, QR (FIG. 5), Array Tag, Dot Code A, MaxiCode (FIG. 6), SmartCode, Snowflake Code or Color Ultra Code) is described in U.S. Publication No. US-2016-0162747. The detection of static retroreflective code patterns suitable to act as reference for the vehicle's ego positioning, redundant to GPS, is described in U.S. Publication No. US-2016-0162747 as well.

The present invention provides further vehicle applications of the passive light code patterns from U.S. Publication No. US-2016-0162747. Furthermore, passive changing patterns as well as active illuminated static or changing patterns can be used in accordance with the present invention.

By combining an automated high beam control or matrix head light control (hereinafter referred to as AHBC) vehicle system with a passive light pattern (or retroreflective light pattern) detection system, a false negative detection enhanced AHBC can be achieved. As an example (but not limited to), at highways with a central barrier, it often happens that truck drivers driving in the opposite direction on the opposite road get dazzled by an opposing vehicle's high beam head lights because the installed AHBC on the opposing vehicle doesn't trigger, since the truck head lights are shadowed or blocked by the highway's middle barrier and the truck driver compartment is at an elevation in which the incoming vehicles head lights are not shadowed or blocked by the middle barrier. To account for this, the AHBC should detect the opposing truck as an approaching vehicle without detecting the trucks head lights. Typically, the discrimination of truck shapes fail, such as when light wanes, for humans as well as for machine vision algorithms. The present invention provides for a reflective code or pattern that can be attached to a truck, such as on an upper region of the truck such as at the roof edge, the upper end of the windshield, the lower end of the windshield, below the windshield or at the back of the left or right (left on right hand traffic, right on right hand traffic) or both exterior side mirrors. The code or tag may be disposed at an upper region of the vehicle's windshield, such as at or near where that vehicle may have its own forward viewing camera, and where the windshield is swept by a windshield wiper of the vehicle to keep that area clear so dirt or the like at the windshield will not block the tag or interfere with the system's ability to detect and identify the tag. The code or tag may identify the truck as such or may classify the truck generally as a road participant.

Figure 3:
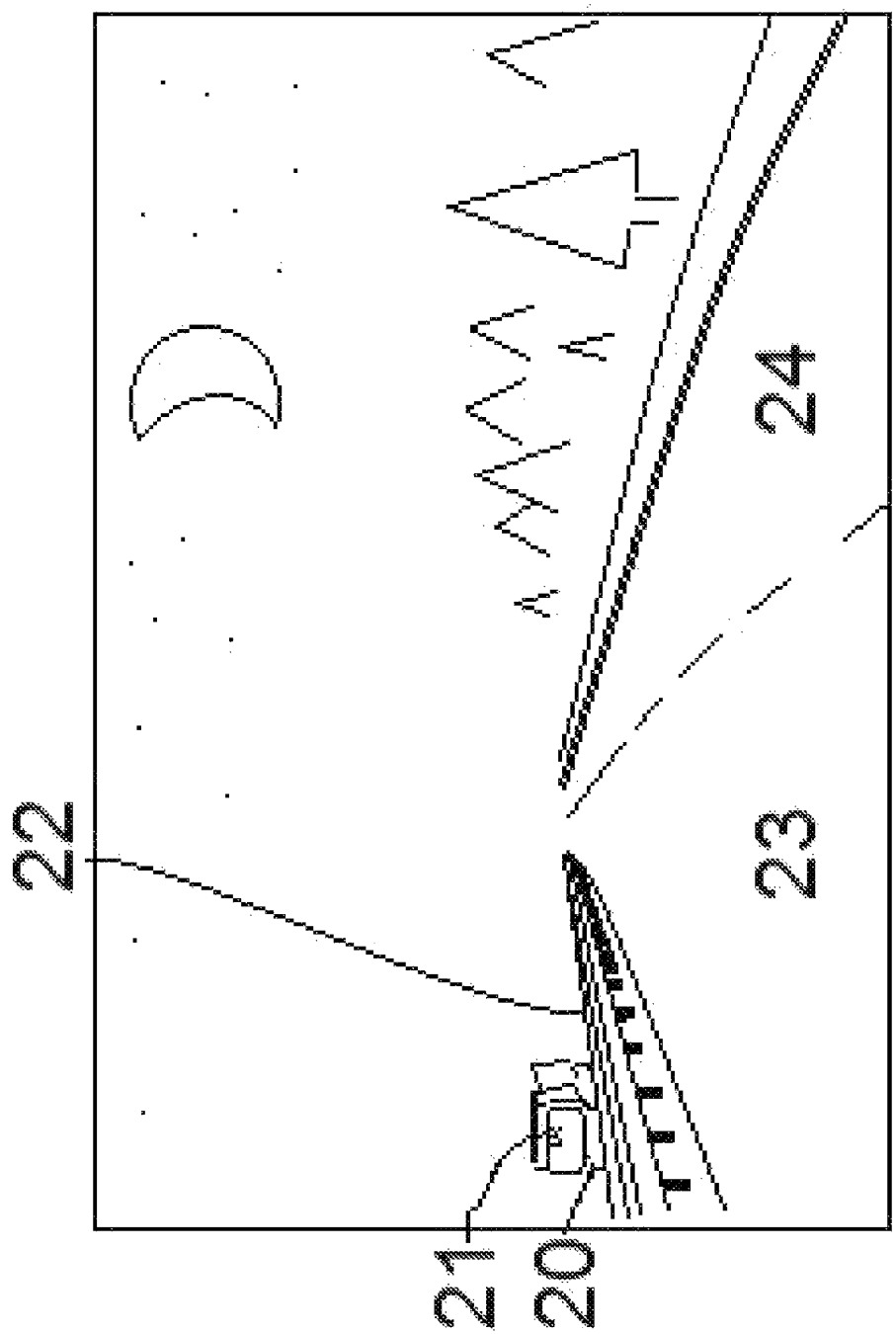
FIG. 3 is an image representative of image data captured by a forward viewing camera of the vehicle, showing another vehicle having a coded tag 21 thereon.
Figure 4:
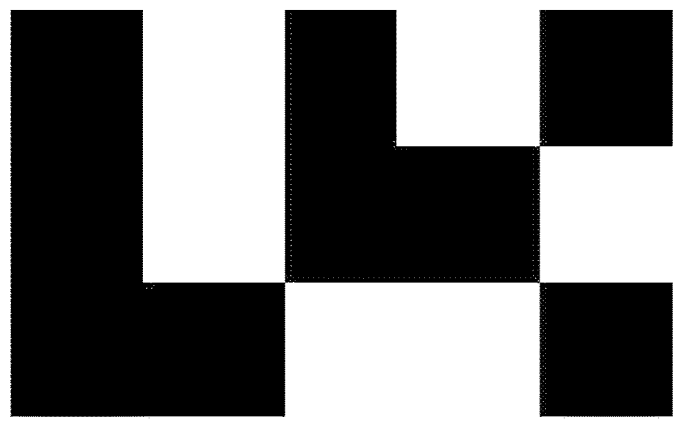
FIG. 4 shows an exemplary tag pattern in the example of FIG. 3.

In FIG. 3, a night time highway scene is shown at which a (ego-) vehicle equipped with a reflective pattern recognition system according the invention is driving along the left (fast) lane 23 of a two lane highway with right hand traffic (the right lane is 24), with a truck 20 approaching at the opposing side of the highway and behind a middle barrier 22 that divides the highway. The middle barrier 22 hides or blocks the truck's head lights from view by the forward viewing camera (such as camera 13 in FIG. 2) of the vehicle (and thus, a typical headlamp control system, which adjusts the headlights to a low beam state responsive to detection of headlights of oncoming vehicles, would not detect or respond to the oncoming truck). The Truck is wearing a code tag 21 (the tag itself of this example is shown in FIG. 4) in the upper middle area of the windshield, which is visible to the forward viewing camera. This enables the reflective pattern recognition system of the present invention at the vehicle traveling along lane 23 (or 24) to detect the truck (and to identify or classify the detected object or vehicle as a truck or at least generally as road participant) and to switch the beam state of the (ego-) vehicle headlights to a lower beam setting, so as to spare the truck driver from the high beam glare.

The system according to the present invention may not be limited to use on highways and may identify several different codes of different types of road users. The identification may be done by classes such as classifying vulnerable road users (VRUs) according EURO-NCAP, such as including bicycles, motorcycles and pedestrians. In general, all potential road users may have at least one dedicated identification coding. Since the coding may not just serve the purpose to identify road users for controlling an AHBC of another vehicle, but may also provide or assist in other driver assistance, vision or automated driving systems, the code pattern or tag may contain more information than just the traffic participant type.

For example, the width of a vehicle may be relevant when two vehicles are approaching a narrow road section (such as a bridge underpass or the like) at night. Whether or not both vehicles are small enough to pass the narrow road section at the same time, such as would be possible when both vehicles are (naturally comparably small) motorcycles and such as may be Impossible when both vehicles are (naturally comparably wide) trucks. In situations where the code detection and type identification of an approaching vehicle can be made early, a semi or fully automated warning and braking system may be able to aid decelerating early, so that the deceleration and acceleration actions (of both vehicles) can be controlled for achieving a higher driving comfort and more economic driving for the individual (equipped) drivers and for increasing the common traffic flow through a narrow road section. Because the identification may be done alternatively by any kind of known art v2v radio data transmission, the visual identification may be done in redundancy. Such v2v communication systems are not fully standardized, mostly only working when the vehicle is powered, and may be slow for identifying opposing traffic (or other objects, such as parked vehicles or pedestrians or bicyclists or the like) early, such as traffic or objects that is/are still a substantial distance ahead of the subject vehicle, such as, for example, more than about 200 m ahead of the subject vehicle.

As suggested in U.S. Publication No. US-2016-0162747, the code pattern may have an autocorrelation and may possess a code redundancy or may have a substantial parity. The code may be a provided as a one dimensional (1D) (bar code) or a two dimensional (2D) pattern or the like. As also suggested in U.S. Publication No. US-2016-0162747, the code may optionally be visible in infrared or near infrared light exclusively or may optionally be visible in infrared and visible wavelengths of light. Optionally, there may be a primary information content present or visible when illuminated by light having a first range of wavelengths, while secondary information content may be present or visible when illuminated by light having another wavelength or spectral band.

Figure 5:
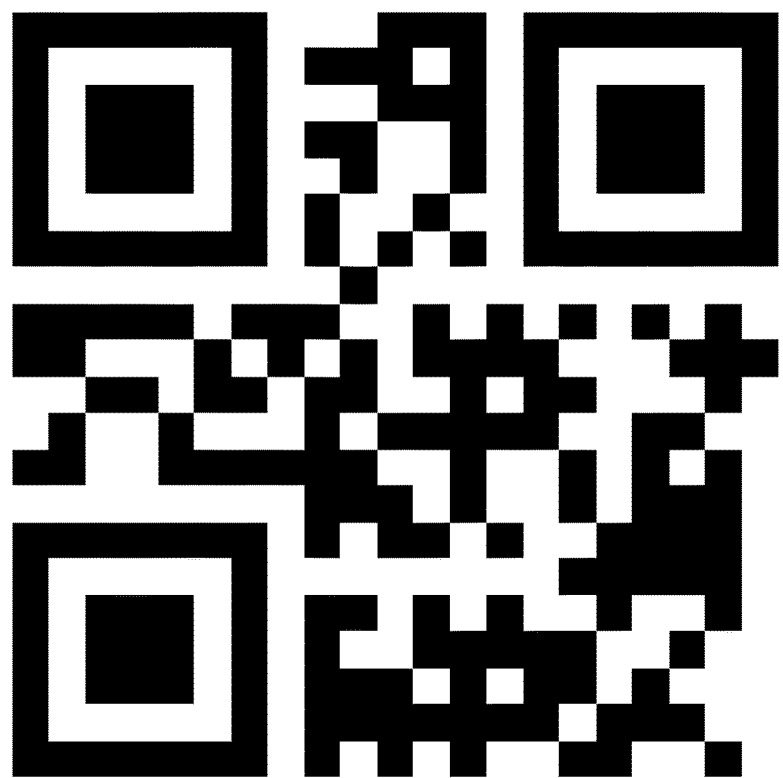
FIG. 5 shows an exemplary QR-coded tag for use with the system of the present invention.
Figure 6:
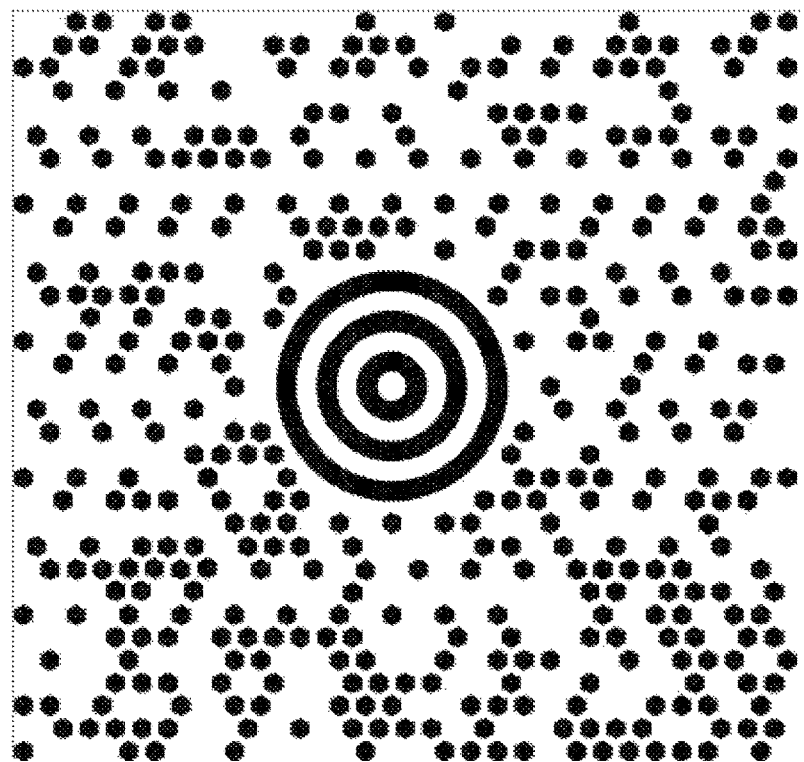
FIG. 6 shows an exemplary Matrix-coded tag for use with the system of the present invention.

Referring to FIGS. 4-10, examples are shown of two dimensional (2D) tags in accordance with the present invention for identifying road participants as such or for providing more detailed information. For example, FIG. 5 shows a QR-code tag, with its typical squared white and black dot bits and three larger target boxes. The vision processing algorithm according the invention may work in two steps. The first step or task is to find a tag in the vision scene (such as the forward scene and such as via image processing of image data captured by the forward viewing camera of the vehicle). A classifier may provide regions of interest (ROI) in which patterns of tags or target like patterns of tags (such as in the content of the tags shown in FIGS. 5-10) are present with an exceeding set probability (for example, a region of interest may be a region where an upper part of an oncoming vehicle may be present, but may not include regions along the ground where a tag is not likely to be present). In the second step, the vision processing algorithm of the present invention may then run any known art match filter within the ROI for detecting and discriminating the target or targets. It is likely that a single target is sufficient (see FIGS. 6-10), since it can be assumed that the tag is always upright, by that no 90 degree or 180 degree rotational error needs to be detected.

For enabling a basic AHBC system (or other ADAS system using road objects) to work to determine or discern or discriminate the presence of a road vehicle at a certain angle (in this example ahead), it may be sufficient to identify the presence of the tag target (for sufficiently turning down or dimming the high beam in the beam area of detected road participants). For more robustness, the system may run one or more plausibility checks, such as checking whether the detected or determined tag or target remains present in consecutive frames of captured image data, or whether the detected or determined tag or target stays in the same region (over short time) or moves along the visual scene space according to a plausible trajectory which may be predicted by reflecting the camera's mounting position and orientation on the ego vehicle, the camera's optical parameters and the road topography of the ego-vehicle's road and the road topography of the tag or target wearing opposing vehicle. The road topography may be previously recorded in a known manner and stored within the ego-vehicle or provided via remote communication with the vehicle. Since the space trajectory prediction is under the influence of some errors, especially the ego-vehicle localization, the trajectory plausibility check window may be set accordingly.

The system of the present invention may be operable to process multiple ROIs, targets and tags. In case multiple road participants are detected at once, the high beam may be dimmed, or in case the vehicle is equipped with a matrix beam, the beam may be dimmed in the regions where the according vehicle targets and tags were identified. The system may be capable of distinguishing multiple road participants from fewer or one road participants having multiple targets as referred below.

Advanced AHBC system's vision algorithms in accordance with the present invention may have another processing step. Tags with a bar code or 2D code, such as, for example, the tags shown in FIGS. 3-6 and 8-11, may provide additional information about the associated road participant. Since the ROI is known, the code can be decoded by the system's vision algorithm. The code may first serve for further checking the plausibility of the presence of the road participant. By that, for example, fake tags put up by any malicious party could be filtered out and ignored by the AHBC for triggering the dimming for the fake road participant. Second, the code may provide worthy information such as the width of the detected or determined or identified road participant.

When actively illuminated tags are in use, optical (by that barely hackable) V2V information exchange may be enabled, limited by the resolution and the camera's frame rate of the V2V data participants. Since the detection of a road participant in the dark is desirable when the distance is still comparably high, the reflecting or actively illuminated tags may possess a comparably big target area such as shown in FIGS. 7-11.

Figure 7:
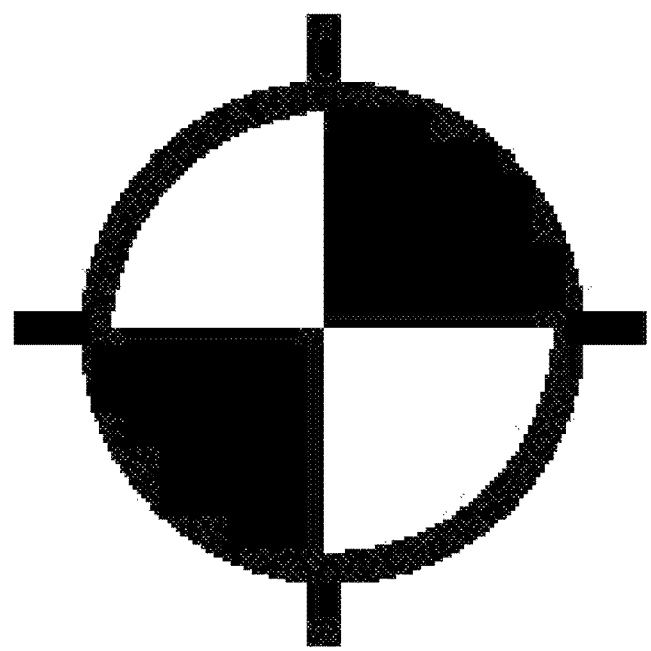
FIG. 7 shows an exemplary tag with a target pattern for use with the system of the present invention.
Figure 8:
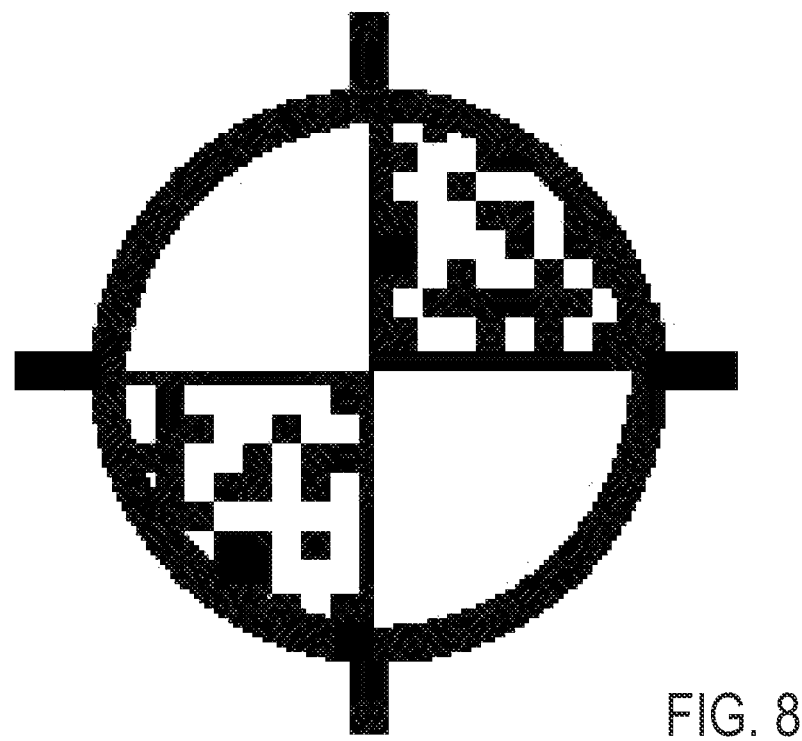
FIG. 8 shows an exemplary tag with a target pattern in which a 2D code is embedded as substructure.
Figure 9:
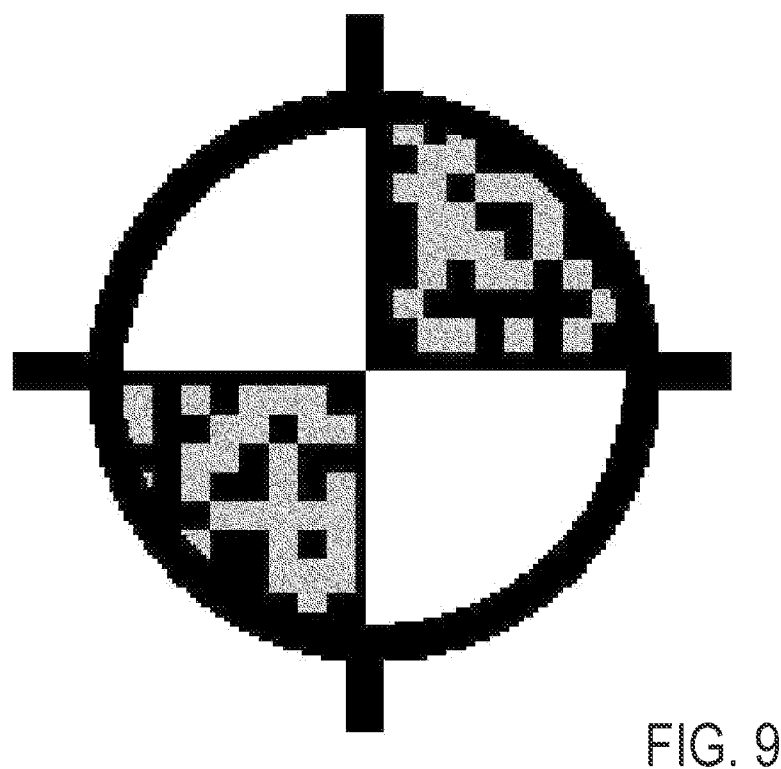
FIG. 9 shows an exemplary tag with a target pattern in which a 2D code is embedded as substructure and the contrast of the dark region is enhanced (areas with gray tones or diffusion dithering)
Figure 10:
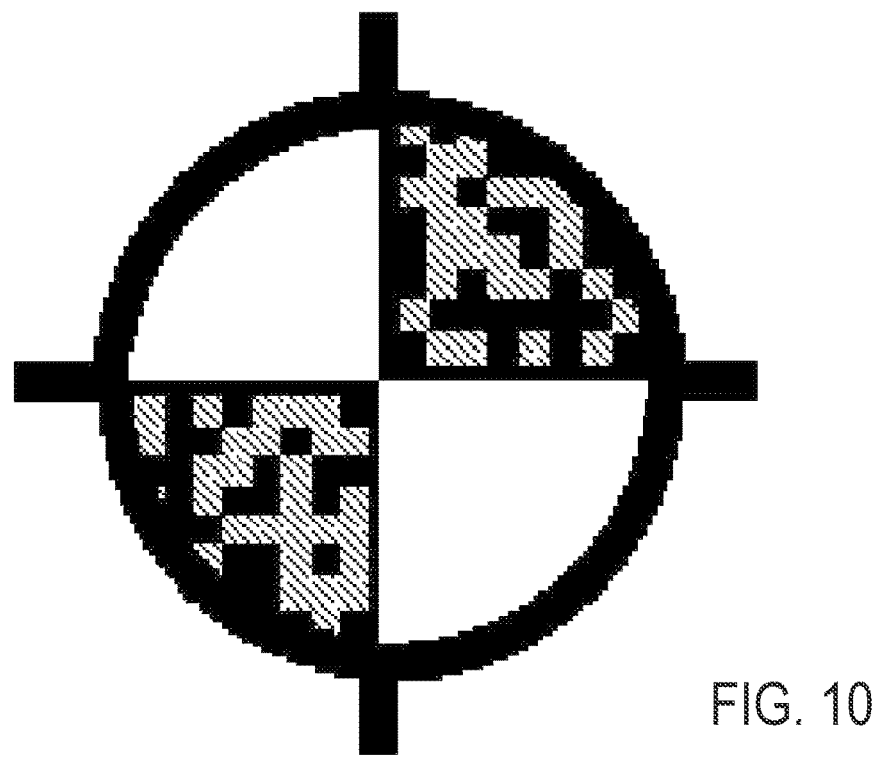
FIG. 10 shows an exemplary tag with a target pattern in which a 2D code is embedded as substructure and the contrast of the dark region is enhanced by areas with pattern dithering.
Figure 11:
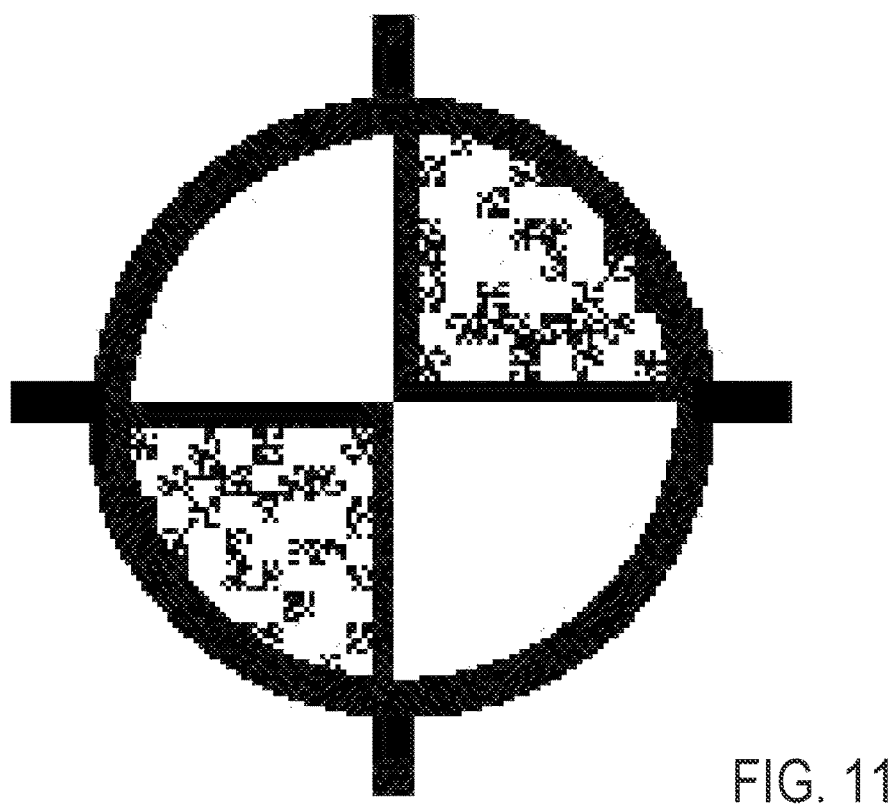
FIG. 11 shows an exemplary tag with a target pattern in which a 2D code is embedded as substructure, with the 2D code's dark bit dots comprising areas which have more 2D code at a higher resolution.

While in FIG. 7 there is no additional 2D code incorporated into the target, the tags of FIGS. 8-11 (and FIG. 6) have additional 2D code (and thus additional information) incorporated therein. These targets have a dual function. When the tag in the size of, for example, 40 cm, gets seen in comparably far distance (such as around 250 m or more) at night, such as by, for example, a five megapixel forward viewing camera with a normal lens or a moderate tele-optic, the white and black quarter circle shape may be discriminable by the detection algorithm having steps one and two as described above. When the vehicles get closer, the inherent 2D code pattern underlying the general (target like-) shape of the tag become perceivable (via further image processing of further captured frames of image data). That distance is more or less dependent on the target size, the viewing angle, the camera resolution and the optics. With the parameters as set forth above, that closer distance (at which the system may determine and obtain further information from the target) may be at about 50 m. In case the camera has twenty megapixels, that closer distance may be extendable to 100 m.

The cheaper solution is to increase the code pattern's dot size. Since the possible extension of a code pattern tag may be limited, the number of bits may be increased by holding the dot size big by having codings in multiple color channels, such as using a code pattern information via green (brightness) in the visible frequency area and an additional code pattern in the reflectiveness of the near infrared (IR) frequency, according the U.S. Publications cited above. Optionally, the IR may be detected by the same camera, or optionally, the IR may be detected by another camera. At the tags of FIGS. 9 and 10, the black-white contrast of the target shape is enhanced by holding the coded region darker using gray tones or a dithering. On the other hand, this decreases the contrast of the coded bits. At the tag of FIG. 11, the (dark) 2D code dots that are perceivable from a moderate distance are done by small 2D code regions itself. This provides even more detail information via the tag reading in case the camera is close enough for discriminating the single dot bits of the small 2D code areas.

Of course in case of low visibility due to weather conditions the tag detection function will be limited accordingly as all optical ADAS systems are limited in such conditions. Optionally, the system may also utilize an auxiliary light source (such as an infrared or near infrared emitting light source) that illuminates the regions of interest in the scene ahead of the vehicle.

Optionally, the code pattern or tag may have a property or characteristic to show different information when being viewed (by a camera) from different angles. By that the code 'image' may vary relative to its viewing or viewed angle (the angle at which it is being viewed). That means when attached to a wearing vehicle it may vary over time when the wearing vehicle passes a detecting vehicle (thus, the system of the detecting vehicle may not only identify the vehicle via processing of captured image data, but may also identify an angle or location of the detected vehicle relative to the subject or detecting vehicle). By that, the system may be able to distinguish between road participants or vehicles seen from the side in opposite to road participants or vehicles seen from head on or at various angles as the vehicles approach one another. Optionally, the code pattern may be attached on a moving or rotating part, such as a wheel, of the wearing vehicle, and by that the visible code pattern may change in captured image frames. Such angle differentiating behavior may either be achieved by using a volume hologram or achieved by using lenticular lenses on top of a reflective pattern code board similar to post cards or the like that have changing or flipping images when turned. Typically, such lenticular lens applications show two different images.

Optionally, it is possible to show more than one or two image(s), such as, for example, four different code images, and by that showing at least more than one code without the need of an 'intelligent' or active display device or light or dot column. Each image may carry a respective code. There may be parity across the whole bunch of code images, such as a check sum over all bits of all code images that may equate an expected value (such as, for example, zero), after overrun, of, for example, four code images carrying 16 bits each.

The present invention thus provides variable passive reflecting codings, stationary passive codings and variable active illuminated codings for non-traffic sign driving, traffic, or traffic participant's information display. As an additional optional aspect of the present invention, the system may not only identify road users by passively reflecting code tables as described above, but may also actively illuminate code tables or displays. For coding traffic participants, the system of the present invention may actively use illuminated PWM controlled light matrixes at the front area of the vehicles, which do not have a beat frequency between the pattern elements (dots, bars, shapes, letters, numbers) itself, but may have a beat frequency against the typical vehicle camera shutter frequency. For example, a typical vehicle camera shutter time is around $1/15$ s. Other typical are fractions of $1/15$ s, such as $1/30$ s, $1/60$ s and $1/120$ s. Especially at night time, many vehicle cameras turn down the sample frequency to 15 fps due to low light.

The pattern matrix may transmit information mono-directionally without using a handshake or using protocol between emitter and detector. Optionally, the emitted code may be a consecutive sequence of codes. Optionally, the sequence may have a start and an end. Optionally, the sequence may have a starting header for synchronizing the reading party.

More advanced systems may have a bidirectional data transmission which may equate to an optical V2V or V2I (vehicle to infrastructure or V2X) communication, optionally using a data transmission protocol. Both systems may possess a projection surface to transmit codes and a camera to pick up codes of the opposing vehicle or infrastructure device.

As an optional application, the system may utilize LED street lights, or lights of facilities such as of parking structures, as optical data transmitters, which may transmit a timely modulated code, a code pattern modulated code or a combination of timely and pattern modulated code, optionally using visual and infrared wavelengths or spectral bands. When done as mono-directional transmitter, the streetlight may emit a kind of broadcast such as news, TV, radio, entertainment and traffic information. When done as bidirectional system, the street light may have an additional camera or light sensor for picking up light signals from vehicles, serving as optical internet access point or the like. Optionally, the street lights or facility lights may set up connection between one another and optionally other light based transmission capable nodes, such as non-traffic lights, non-parking structure lights or non-street lights, such as lights on transmission gateways (such as, for example, mounted on nearby buildings or transmission towers. The gateways may link the light based data transmission grids to the internet. Optionally, for bridging father distances (such as, for example, greater than about 15 m or thereabouts) directed LASERs (point to point laser link) may come into use instead of more or less diffuse LEDs for lighting purposes. Optionally, the chosen LASER may comprise a vertical-cavity surface-emitting laser (VCSEL) type.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or 4G or 5G) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096: US-2015-0352953; US-2016-0036917 and/or US-2016-0210853, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or capacitive sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2010/099416; WO 2011/028686 and/or WO 2013/016409, and/or U.S. Pat. Publication No. US 2010-0020170, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. Pat. Nos. 8,542,451; 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO/2009/036176 and/or WO/2009/046268, which are all hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Optionally, the vision system (utilizing the forward facing camera and a rearward facing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:
1. A vision system for a vehicle, said vision system comprising:

a camera configured to be disposed at a vehicle equipped with said vision system so as to have a field of view forward of the equipped vehicle;

an image processor operable to process image data captured by said camera when said camera is disposed at the equipped vehicle;

a tag element disposed at another vehicle, said tag element having a pattern thereat;

wherein, with said camera disposed at the equipped vehicle and when the tag element is present in the field of view of said camera, said image processor is operable to process image data by said camera to determine the pattern of the tag element present in the field of view of said camera;

wherein said image processor compares the determined pattern of the tag element to a database of patterns and classifies the tag element at least in part responsive to determination that the determined pattern of the tag element generally matches a pattern of the database;

wherein the pattern of the tag element disposed at the other vehicle includes information at least pertaining to a type of the other vehicle; and wherein, responsive to determination that the determined pattern of the tag element generally matches a pattern of the database, headlamps of the equipped vehicle are adjusted.

2. The vision system of claim 1, wherein said image processor compares movement of the determined pattern of the tag element over multiple frames of captured image data to the database and classifies the determined pattern of the tag element at least in part responsive to determination that the movement of the determined pattern of the tag element generally matches the database.

3. The vision system of claim 1, wherein the database of patterns includes two dimensional codes.

4. The vision system of claim 1, wherein the database of patterns includes bar codes.

5. The vision system of claim 1, wherein the tag element reflects near infrared light and wherein said camera is sensitive to near infrared light.

6. The vision system of claim 5, comprising a near infrared light source disposed at the equipped vehicle, wherein said camera is disposed at or near said near infrared light source.

7. The vision system of claim 1, wherein the pattern of the tag element comprises a coding pattern and wherein image data captured by said camera is processed to determine the coding pattern.

8. A vision system for a vehicle, said vision system comprising:

a camera configured to be disposed at a vehicle equipped with said vision system so as to have a field of view forward of the equipped vehicle;

an image processor operable to process image data captured by said camera when said camera is disposed at the equipped vehicle;

a tag element disposed at another vehicle, said tag element having a pattern thereat;

wherein, with said camera disposed at the equipped vehicle and when the tag element is present in the field of view of said camera, said image processor is operable to process image data by said camera to determine the pattern of the tag element present in the field of view of said camera;

wherein said image processor compares the determined pattern of the tag element to a database of patterns and classifies the tag element at least in part responsive to determination that the determined pattern of the tag element generally matches a pattern of the database;

wherein the pattern of the tag element disposed at the other vehicle includes information at least pertaining to a type of the other vehicle;

wherein the pattern of the tag element shows different information when viewed from different angles, and wherein said image processor, responsive to processing of captured image data, determines an angle between the equipped vehicle and the other vehicle at which the tag element is disposed.

9. The vision system of claim 1, wherein the tag element is movably disposed at the other vehicle.

10. The vision system of claim 1, wherein the tag element includes information pertaining to a size of the other vehicle.

11. The vision system of claim 1, wherein the headlamps of the equipped vehicle are adjusted irrespective of detection of a headlamp of the other vehicle that is approaching the equipped vehicle.

12. A vision system of a vehicle, said vision system comprising:

a camera configured to be disposed at a vehicle equipped with said vision system so as to have a field of view forward of the equipped vehicle;

an image processor operable to process image data captured by said camera when said camera is disposed at the equipped vehicle;

a tag element disposed at another vehicle, said tag element having a two dimensional pattern thereat;

wherein, with said camera disposed at the equipped vehicle and when the tag element is present in the field of view of said camera, said image processor is operable to process image data by said camera to determine the two dimensional pattern of the tag element present in the field of view of said camera;

wherein said image processor compares the determined two dimensional pattern of the tag element to a database of two dimensional patterns and classifies the tag element at least in part responsive to determination that the determined two dimensional pattern of the tag element generally matches a two dimensional pattern of the database;

wherein the pattern of the tag element disposed at the other vehicle includes information at least pertaining to one of (i) a type of the other vehicle and (ii) a size of the other vehicle; and wherein, responsive to determination that the determined two dimensional pattern of the tag element generally matches a two dimensional pattern of the database, headlamps of the equipped vehicle are adjusted.

13. The vision system of claim 12, wherein said image processor compares movement of the determined two dimensional pattern of the tag element over multiple frames of captured image data to the database and classifies the determined two dimensional pattern of the tag element at least in part responsive to determination that the movement of the determined two dimensional pattern of the tag element generally matches the database.

14. The vision system of claim 12, wherein the pattern of the tag element comprises a two dimensional coding pattern and wherein image data captured by said camera is processed to determine the two dimensional coding pattern.

15. The vision system of claim 12, wherein the two dimensional pattern of the tag element shows different information when viewed from different angles, and wherein said image processor, responsive to processing of captured image data, determines an angle between the equipped vehicle and the other vehicle at which the tag element is disposed.

16. The vision system of claim 12, wherein the headlamps of the equipped vehicle are adjusted irrespective of detection of a headlamp of the other vehicle that is approaching the equipped vehicle.

17. A vision system for a vehicle, said vision system comprising:
- a camera configured to be disposed at a vehicle equipped with said vision system so as to have a field of view forward of the equipped vehicle;
- an image processor operable to process image data captured by said camera when said camera is disposed at the equipped vehicle;
- a tag element disposed at another vehicle, wherein the tag element has a coding pattern thereat;
- a near infrared light source disposed at the equipped vehicle and operable to emit near infrared light;
- wherein the tag element reflects near infrared light emitted by said near infrared light source, and wherein said camera is sensitive to near infrared light;
- wherein, with said camera disposed at the equipped vehicle and when the tag element is present in the field of view of said camera, said image processor is operable to process image data by said camera to determine the coding pattern of the tag element present in the field of view of said camera;
- wherein said image processor compares the determined coding pattern of the tag element to a database of patterns and classifies the tag element at least in part responsive to determination that the determined coding pattern of the tag element generally matches a coding pattern of the database;
- wherein the coding pattern of the tag element disposed at the other vehicle includes information at least pertaining to one of (i) a type of the other vehicle and (ii) a size of the other vehicle; and
- wherein the coding pattern of the tag element shows different information when viewed from different angles, and wherein said image processor, responsive to processing of captured image data, determines an angle between the equipped vehicle and the other vehicle at which the tag element is disposed.

18. A vision system for a vehicle, said vision system comprising:
- a camera configured to be disposed at a vehicle equipped with said vision system so as to have a field of view forward of the equipped vehicle;
- an image processor operable to process image data captured by said camera when said camera is disposed at the equipped vehicle;
- a tag element disposed at another vehicle, wherein the tag element has a coding pattern thereat;
- a near infrared light source disposed at the equipped vehicle and operable to emit near infrared light;
- wherein the tag element reflects near infrared light emitted by said near infrared light source, and wherein said camera is sensitive to near infrared light;
- wherein, with said camera disposed at the equipped vehicle and when the tag element is present in the field of view of said camera, said image processor is operable to process image data by said camera to determine the coding pattern of the tag element present in the field of view of said camera;
- wherein said image processor compares the determined coding pattern of the tag element to a database of patterns and classifies the tag element at least in part responsive to determination that the determined coding pattern of the tag element generally matches a coding pattern of the database;
- wherein the coding pattern of the tag element disposed at the other vehicle includes information at least pertaining to one of (i) a type of the other vehicle and (ii) a size of the other vehicle; and
- wherein, responsive to determination that the determined coding pattern of the tag element generally matches a coding pattern of the database, headlamps of the equipped vehicle are adjusted, and wherein the headlamps of the equipped vehicle are adjusted irrespective of detection of a headlamp of the other vehicle that is approaching the equipped vehicle.

\* \* \* \* \*